United States Patent
Lagorce et al.

(10) Patent No.: US 12,462,590 B2
(45) Date of Patent: Nov. 4, 2025

(54) METHOD FOR AUTOMATICALLY ADAPTING A PATTERN PROJECTION RATE IN AN ACTIVE PERCEPTION SYSTEM

(71) Applicant: Prophesee, Paris (FR)

(72) Inventors: Xavier Lagorce, Saint-Maur-des-Fossés (FR); Artiom Tchouprina, Herblay (FR)

(73) Assignee: Prophesee, Paris (FR)

( * ) Notice: Subject to any disclaimer, the term of this patent is extended or adjusted under 35 U.S.C. 154(b) by 1016 days.

(21) Appl. No.: 17/534,884

(22) Filed: Nov. 24, 2021

(65) Prior Publication Data

US 2022/0166944 A1    May 26, 2022

(30) Foreign Application Priority Data

Nov. 25, 2020   (EP) .................................. 20209903

(51) Int. Cl.
| | |
|---|---|
| *H04N 5/353* | (2011.01) |
| *G06V 10/145* | (2022.01) |
| *G06V 20/64* | (2022.01) |
| *H04N 5/225* | (2006.01) |
| *H04N 5/232* | (2006.01) |

(52) U.S. Cl.
CPC ............ *G06V 20/64* (2022.01); *G06V 10/145* (2022.01)

(58) Field of Classification Search
CPC .............................. G06V 20/64; G06V 10/145
See application file for complete search history.

(56) References Cited

U.S. PATENT DOCUMENTS

| | | | |
|---|---|---|---|
| 2015/0285625 A1 | 10/2015 | Deane | |
| 2020/0058205 A1* | 2/2020 | Yaffe .................. | G08B 13/1961 |

FOREIGN PATENT DOCUMENTS

WO          2020169834 A1     8/2020

* cited by examiner

*Primary Examiner* — Jamil Ahmed

(57) ABSTRACT

A method is generally provided for adjusting a pattern projection rate in an active perception system, comprising the steps of observing a scene with an event-based sensor array; projecting a current light pattern of a sequence of light patterns on the scene for a given interval of time; retrieving events generated by the event-based sensor array in response to the projection of the current light pattern; monitoring a property of the event retrieval progress; and dynamically controlling the projection of the light pattern based on the property.

10 Claims, 1 Drawing Sheet

METHOD FOR AUTOMATICALLY ADAPTING A PATTERN PROJECTION RATE IN AN ACTIVE PERCEPTION SYSTEM

CROSS-REFERENCE TO RELATED APPLICATION

This application is based on and claims priority under 35 U.S.C. 119 to European Patent Application No. EP20209903.2 filed on Nov. 25, 2020, the disclosure of which is herein incorporated by reference in its entirety.

FIELD

The present disclosure relates to the use of event-based cameras for capturing scenes in an active perception system, in particular a structured light perception system.

BACKGROUND

In a structured light perception system, a sequence of spatial patterns is projected onto a scene and captured by a camera sensor array for performing a three-dimensional reconstruction by triangulation. In an active stereo system, the pattern projection is captured by two distinct cameras. Patent application WO2020/169834 discloses a structured light perception system using an event-based camera for capturing the projected patterns. The use of an event-based camera significantly reduces the image data rate and thus the image processing resources for the 3D reconstruction process. However, the system could be further improved by using other properties of an event-based camera.

SUMMARY

A method is generally provided for adjusting a pattern projection rate in an active perception system, comprising the steps of observing a scene with an event-based sensor array; projecting a current light pattern of a sequence of light patterns on the scene for a given interval of time; retrieving events generated by the event-based sensor array in response to the projection of the current light pattern; monitoring a property of the event retrieval progress; and dynamically controlling the projection of the light pattern based on the property.

The method may further comprise the step of dynamically triggering the projection of the next light pattern in the sequence when the property meets an end-of-burst criterion.

The method may comprise the further steps of setting a counter with a value based on the number of generated events; and decrementing the counter as the events are retrieved; wherein the end-of-burst criterion is met when the counter value falls below a threshold.

The method may alternatively comprise the further step of computing an event retrieval rate as the events are retrieved; wherein the end-of-burst criterion is met when the event retrieval rate falls below a threshold.

The end-of-burst criterion may alternatively be met when no events are generated over a number of successive cycles of a system clock.

Monitoring of the property may start an amount of time after the beginning of the projection.

The projection of the next light pattern may occur a fixed amount of time after the end-of-burst condition is met.

The sensor array may include pixels organized in rows, the method comprising the steps of generating a request for each row in which at least one pixel generates an event; setting the counter with the number of rows having generated a request; and decrementing the counter by one each time all the events of one row are retrieved.

The event retrieval rate may be computed as a sliding average over several retrieval cycles.

The method may comprise the further step of dynamically stopping the projection of the current light pattern when the property meets a peak event generation criterion.

The method may comprise the further step of delaying the event retrieval until the counter meets a stationary condition.

BRIEF DESCRIPTION OF THE DRAWINGS

Other advantages and features will become more clearly apparent from the following description of particular embodiments of the disclosure provided for exemplary purposes only and represented in the appended drawings, in which.

DETAILED DESCRIPTION

In structured light perception systems, even those using event-based cameras, the successive light patterns of a sequence are projected at a fixed rate, where the time separating two projections, or flashes, is constant and selected at a value corresponding to a worst-case situation.

Between consecutive flashes, the camera should be given time to acquire all changes in the scene caused by the preceding flash. With a traditional camera, the camera operates at a constant frame rate on which the flash rate is synchronized. With an event-based camera, the time required to retrieve the events caused by a flash depends on the number of events, i.e. the number of pixels that see a change of lighting, which may vary with the specific pattern projected, movement in the scene, the relative locations of the scene, the structured light projector and the camera, etc. Hence, the projection rate is usually set with a period equal to the time required to retrieve a number of events corresponding to all the pixels of the camera sensor, which is most of the time slower than necessary.

To increase the projection rate, the present disclosure provides to make the projection rate variable and dynamically adapted to the time used for retrieving a burst of events caused by each flash. Indeed, a next flash in a sequence can be triggered as soon as all the events caused by the previous flash are retrieved—whereby the projection rate is increased in average relative to a worst-case situation where all the pixels of the sensor should be read out.

Figure 1:
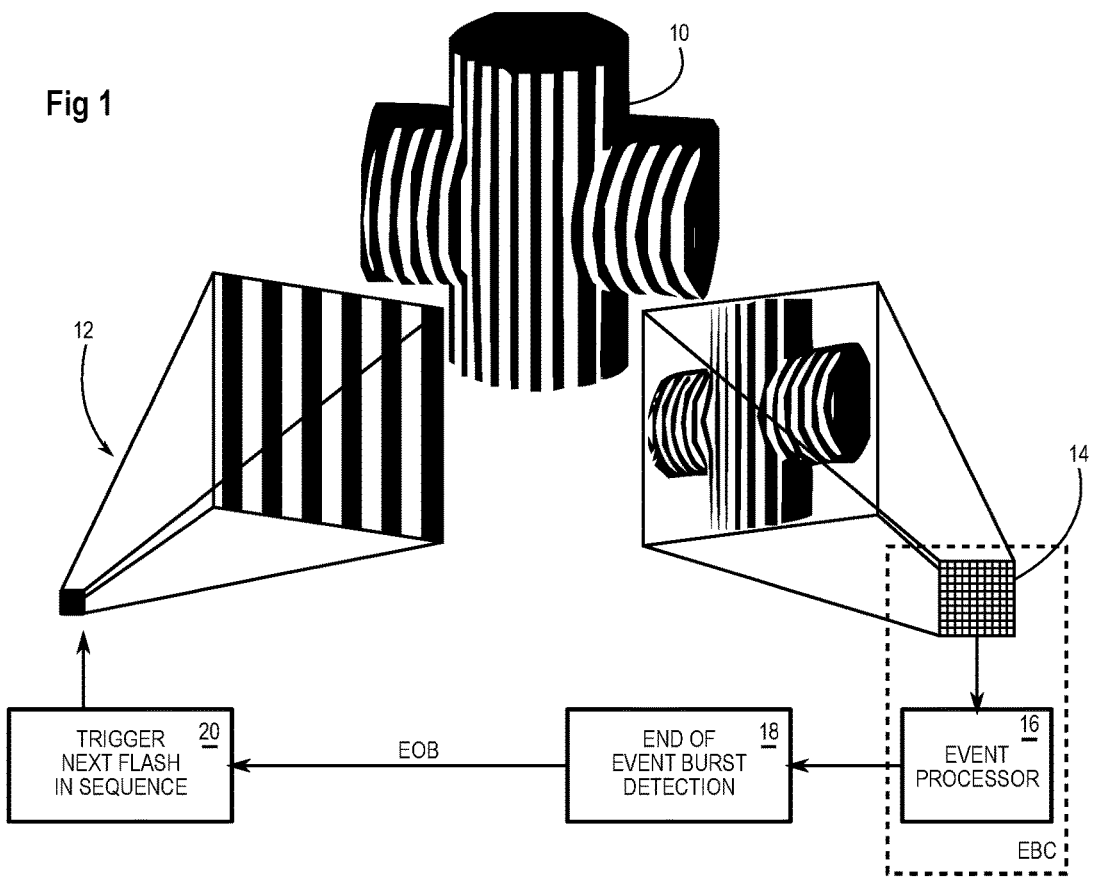
FIG. 1 schematically illustrates an exemplary structured light perception system including an embodiment of an adaptive projection rate control system.

FIG. 1 schematically illustrates an exemplary structured light perception system including an embodiment of an adaptive projection rate control system. A scene including a three-dimensional object 10 is illuminated by a projector 12 and observed at an angle by an event-based camera EBC.

The projector 12 is designed to project a sequence of patterns adapted to a 3D reconstruction of the object, such as a set of vertical line patterns, where the white lines, representing light, assume different positions across the multiple patterns of the set, such that the lines scan all of the surface area of the scene.

The camera EBC includes a sensor array 14 on which the scene is focused and an event processing circuit 16, often called arbiter, designed to retrieve the events from the sensor array as they occur asynchronously. The retrieved events are output through an interface in a known format, usually conveying the type, the address (position in the array) and a time stamp. The event type is typically "positive" or "on" for a brightness increase, and "negative" or "off" for a brightness decrease.

The system of FIG. 1 as described up to now may be conventional, such as disclosed in patent application WO2020/169834.

The system moreover includes a device 18 connected to receive event data from the camera EBC, and configured to detect the end of a burst of events caused by each flash. Each time an end-of-burst is detected, the device enables an end-of-burst signal EOB. In practice, the EOB signal is enabled for a short amount of time, forming a pulse. Examples of criteria for an end-of-burst detection are disclosed subsequently.

A control circuit 20 of the projector, designed to set the projection rate of the sequence of patterns, may be modified to use the EOB signal as a clock, whereby a next projection is triggered each time the EOB signal exhibits a pulse.

In the absence of EOB pulses, the projector 12 may be designed to conventionally project the sequence of patterns in a free-running mode, at a fixed frequency corresponding to the worst-case situation. The EOB pulses then override the free-running mode as they appear.

Figure 2:
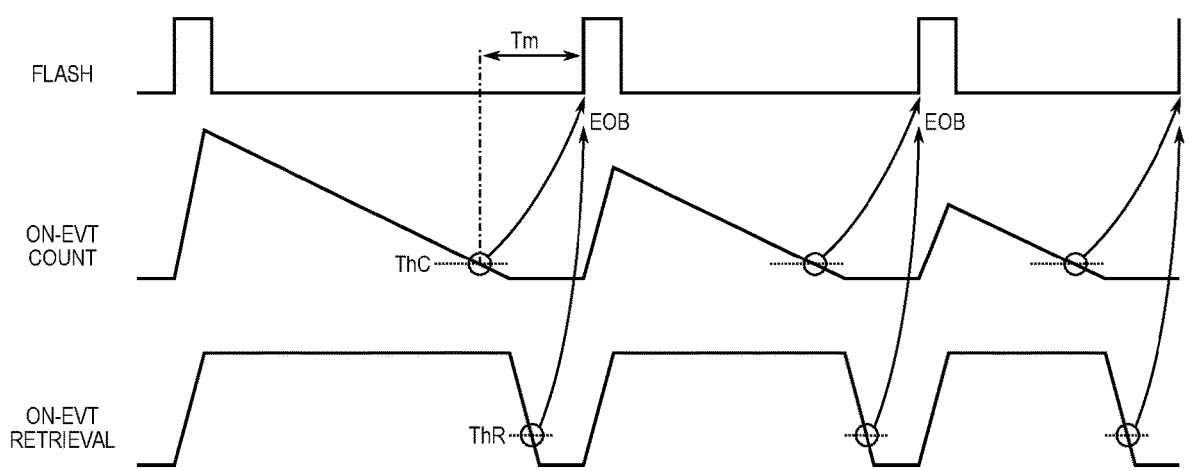
FIG. 2 illustrates time diagrams of two embodiments of an adaptive projection rate control process.

FIG. 2 illustrates time diagrams of two examples of an adaptive projection rate control process that can be implemented in the system of FIG. 1, especially the end-of-burst detection device 18.

The top diagram illustrates a sequence of pulses corresponding to projections of patterns, or flashes, by the projector 12. Each flash except for the first is triggered by an end-of-burst condition EOB that may be determined by various methods, two of which are exemplified in the two lower diagrams.

In a first example, it is assumed that the camera EBC, in particular its event processor 16, includes an event counter that is incremented asynchronously as events appear, and decremented as the events are retrieved and cleared. As mentioned previously, events may be "on" or "off" events. Each flash will in practice cause a burst of on-events followed, normally, by a burst of off-events. For the purposes of the present disclosure, only the on-events may be considered, so the events referred to hereinafter will in fact be on-events.

The second diagram thus illustrates the evolution of the event counter, that will be evaluated to detect an end-of-burst criterion and trigger the next flash when that criterion is met.

The counter is initially at zero. Just after the start of a flash, the event count rapidly increases to reach a peak value as the largest pixel latency time is reached, which may happen typically, as shown, before the flash ends.

At the flash end, the event count gradually decreases as the events are retrieved and cleared by the event processor 16 (FIG. 1).

In theory, the end-of-burst criterion could be met as soon as the event count reaches zero again. In practice, however, spurious events are triggered due to noise, whereby the event count does not assume a stable zero value, or sometimes never even reaches zero. Therefore, preferably, the EOB criterion is assumed satisfied when the event count falls below a threshold ThC. The count threshold ThC may be several tens, for example.

In some circumstances (not shown), the next flash may be triggered almost immediately, just after a short period of time required for retrieving the events remaining below the threshold ThC.

In other circumstances, a limit may be imposed on the shortest time between two flashes, for instance for ensuring eye-safety or for offering sufficient processing time to the 3D reconstruction system. In such a case, the next flash may be delayed by a given time margin Tm after the EOB criterion is met, as shown.

The EOB criterion may be evaluated using the count history and be considered as met when the current count is below the threshold ThC while one or several previous counts are above the threshold. Another alternative is to simply compare the current count with the threshold, and to enable the comparator output after a given delay following the flash triggering, to allow the count to exceed the threshold at the beginning of the burst.

The diagrams illustrate an exemplary situation where the sizes of the event bursts decrease from one flash to the next, illustrating variations in the scene properties, such as when the object moves away from the camera. It is apparent that the time intervals between the flashes decrease correspondingly.

Providing an event counter that follows each event individually may be difficult to implement in some situations. In a typical event-based camera, events are evaluated by rows of the sensor array, i.e. as soon as a first event occurs in a row, the row issues a request for retrieval to an arbiter, and only one such request is issued no matter how many events occur later in the row before the arbiter processes the request. In such a case, the counter may simply count the row requests instead of the actual events, and be decremented as the row requests are processed and cleared by the arbiter. The event count is then less accurate but remains commensurate with a burst size and the desired functionality is still achieved.

In a second example, the end-of-burst criterion is based on the evolution of the instantaneous event retrieval rate. As before, the event processor 16 retrieves both on- and off-events, but, preferably, only the on-events are considered, because they occur earlier.

The bottom diagram thus illustrates the evolution of the instantaneous event retrieval rate, that will be monitored to detect an end-of-burst criterion and trigger the next flash when that criterion is met.

The retrieval rate is initially zero. From the beginning of the first flash, the retrieval rate increases as the events appear, and caps at a peak speed where events are retrieved using the system's full bandwidth. The peak speed is maintained as long as events remain to be retrieved, and drops abruptly when no events remain, i.e. when the burst of events caused by the flash has been fully retrieved.

The raise and drop of the retrieval rate are shown as progressive, because, in practice, the event rate may be computed as a sliding average over several clock cycles to filter noise and spurious variations.

Like before, to satisfy a limit that may be imposed on the shortest time between two flashes, the next flash may be delayed by a given time margin, as shown.

In theory, the EOB criterion could be considered as met when the retrieval rate reaches zero. In practice, however, spurious events are triggered due to noise, whereby the retrieval rate does not assume a stable zero value, or sometimes never even reaches zero. Therefore, preferably, the EOB criterion is assumed satisfied when the retrieval rate falls below a threshold ThR of, for example, around 10% of the peak rate.

The EOB criterion may be evaluated using the instantaneous rate history and be considered as met when the current rate value is below the threshold ThR while one or several previous rate values are above the threshold. Another alternative is to simply compare the current rate value with the threshold, and to enable the comparator output after a given delay following the flash triggering, to allow the rate value to exceed the threshold at the beginning of the burst.

The event retrieval rate evolution shown follows an exemplary model where a same number of events are retrieved at each cycle of a system clock, typically one event per cycle for first generation event-based cameras. In more recent event-based cameras, the pixels of each row may be grouped in "vectors", where one vector containing at least one event is retrieved at each cycle. As a result, a variable number of events is retrieved at each cycle, between one and the size of the vector. In such a case, it is recommendable to compute a sliding average event retrieval rate over multiple cycles to filter out the variations from one cycle to the next or to replace the event retrieval rate by a vector retrieval rate which will show the same properties.

Another method for determining an end-of-burst condition may be based on the relative quiescence occurring after a burst. For this purpose, an absence of events may be monitored after each flash, and the EOB condition be assumed satisfied if no events have been generated over a number of successive clock cycles, for instance 3 to 10 cycles.

As previously mentioned with respect to the method based on the event counter (second diagram of FIG. 2), the count may reach a peak before the end of the flash. In this case, the flash duration appears to be longer than necessary. It could be useful to end the flash earlier, which would reduce motion blurriness and further increase the average projection rate. For this purpose, the system may be configured to stop the flash as soon as a peak in the event count is detected.

In practice, due to the differences in reaction times of the pixels, depending on their individual lighting conditions, some events occur earlier than others, and the earlier events may be retrieved by the arbiter before all events have actually occurred. In such a case, the counter would start decrementing before it can reach a peak value representative of all the events, and exhibit an early false peak.

To avoid this situation, the retrieval of the events may be delayed until the count reaches a stationary condition, such as remaining at a same value for a few clock cycles. Such a stationary value would in principle be the peak count value.

Using the event retrieval rate method, a similar functionality for adjusting the flash duration may be achieved by detecting that the event retrieval rate (last diagram of FIG. 2) caps out.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for adjusting a pattern projection rate in an active perception system, the method comprising:
   observing a scene with an event-based sensor array;
   projecting a current light pattern of a sequence of light patterns on the scene for a given interval of time;
   retrieving events generated by the event-based sensor array in response to the projection of the current light pattern;
   monitoring event retrieval progress to determine an end-of-burst criterion in the events; and
   dynamically triggering a projection of a next light pattern in the sequence of light patterns when the end-of-burst criterion is met.

2. The method of claim 1, comprising:
   setting a counter with a value based on a number of generated events; and
   decrementing the counter as the events are retrieved;
   wherein the end-of-burst criterion is met when the value of the counter falls below a threshold (ThC).

3. The method of claim 1, comprising:
   computing an event retrieval rate as the events are retrieved;
   wherein the end-of-burst criterion is met when the event retrieval rate falls below a threshold (ThR).

4. The method of claim 1, wherein the end-of-burst criterion is met when no events are generated over a number of successive cycles of a system clock.

5. The method of claim 1, wherein monitoring of the event retrieval progress starts an amount of time after a beginning of the projection.

6. The method of claim 1, wherein the projection of the next light pattern occurs a fixed amount of time (Tm) after the end-of-burst criterion is met.

7. The method of claim 2, wherein the sensor array includes pixels organized in rows, the method comprising:
   generating a request for each row in which at least one pixel generates an event;
   setting the counter with a number of rows having generated a request; and
   decrementing the counter by one each time all events of one row are retrieved.

8. The method of claim 3, wherein the event retrieval rate is computed as a sliding average over several retrieval cycles.

9. The method of claim 2, comprising:
   delaying the event retrieval until the counter meets a stationary condition.

10. A method for adjusting a pattern projection rate in an active perception system, the method comprising:
    observing a scene with an event-based sensor array;
    projecting a current light pattern of a sequence of light patterns on the scene for a given interval of time;
    retrieving events generated by the event-based sensor array in response to the projection of the current light pattern;
    monitoring event retrieval progress; and
    dynamically stopping the projection of the current light pattern when the event retrieval meets a peak event generation criterion.

* * * * *